United States Patent

[11] 3,584,912

| | | | |
|---|---|---|---|
| [72] | Inventor | Andre Bernard Leger<br>Sartrouville, France | |
| [21] | Appl. No. | 824,616 | |
| [22] | Filed | May 14, 1969 | |
| [45] | Patented | June 15, 1971 | |
| [73] | Assignees | Automobiles Peugeot<br>Paris, France;<br>Nationale Des Usines Renault<br>Billancourt, France | |
| [32] | Priority | July 25, 1968 | |
| [33] | | France | |
| [31] | | 160569 | |

[54] CONTROL DEVICE FOR CONTROLLING A LOCKABLE MOVABLE CLOSING PANEL AND IN PARTICULAR A TOP OF A CONVERTIBLE VEHICLE
5 Claims, 6 Drawing Figs.

[52] U.S. Cl. .................................................. 296/117,
49/280, 200/61.64, 292/247, 296/121
[51] Int. Cl. .................................................. B60j 7/12

[50] Field of Search.................................... 296/107,
112, 115, 117, 121; 49/15, 18, 31, 280; 200/61.62,
61.64, 61.67; 292/247; 180/111, 112

[56] References Cited
UNITED STATES PATENTS

| 1,982,301 | 11/1934 | Harvey........................ | 49/280 |
| 2,053,624 | 9/1936 | Meunier et al................ | 49/280 X |
| 2,679,039 | 5/1954 | Koppl.......................... | 340/282 |
| 2,792,917 | 5/1957 | Smith et al.................... | 49/18 X |
| 3,343,302 | 9/1967 | Browning et al.............. | 49/18 |
| 3,425,742 | 2/1969 | Rauber......................... | 296/121 |
| Re21,775 | 4/1941 | Falcon.......................... | 296/117 |

Primary Examiner—Benjamin Hersh
Assistant Examiner—Leslie J. Paperner
Attorney—Burns, Doane, Swecker & Mathis ABSTRACT: Control device for a panel, such as the top of a convertible vehicle. The locking means for locking the top in the closing position are arranged to prevent operation of a motor for shifting the top when the locking means are not unlocked or insufficiently unlocked.

CONTROL DEVICE FOR CONTROLLING A LOCKABLE MOVABLE CLOSING PANEL AND IN PARTICULAR A TOP OF A CONVERTIBLE VEHICLE

The present invention relates to electric or electrohydraulic control devices for shifting movable closing panels, comprising a manual means for locking said panel in at least one of its positions, namely the closed position and open position, and in particular the tops of automobile vehicles of the convertible type.

Convertible vehicles equipped with an electrically controlled top or roof comprise an electric motor which drives a mechanical system or a pump feeding hydraulic cylinders. The top is caused to open or close by the actuation of an electric reversing switch having a stable "stop" position and two unstable positions, namely an "open" position and a "closed" position. Rotation of the motor in one direction produces the opening and the rotation in the other direction the closing of the top. The hooking or locking of the top to the upper part of the windscreen surround remains a manual operation. Now, the top control devices, whether they be electromechanical or electrohydraulic, are capable of producing very great forces. When the arrangement is such that it allows the possibility of acting on the top when it is still hooked, serious drawbacks arise such as a stretching or tearing of the top or deformation of the windscreen pillars.

The object of the invention is to provide a control device for a closing movable panel such as a top of a convertible vehicle, said device having an electric motor and at least one manually controlled locking means for locking the panel in at least one of its extreme positions, being so improved as to avoid the aforementioned drawbacks.

The invention provides a control device comprising a supply circuit for the motor, a first switch in said supply circuit, a relay having a moving element connected to said first switch for actuating said first switch and a relay supply circuit, a second switch having a moving contact and a fixed contact in said relay supply circuit, said locking means comprising a hook, a base, a lever pivoted to the base and capable of pivoting through an overcenter, a yoke connected to the lever and capable of hooking the hook for locking said panel in said one extreme position, the hook and the base constituting respectively said contacts of said second switch, the arrangement being such that said first switch is opened by said moving element when the relay is energized by the closure of said second switch and said first switch is closed by said moving element when said second switch is opened by separation of the hook from the base.

Further features and advantages of the invention will be apparent from the ensuing description with reference to the accompanying drawings.

Figure 1:
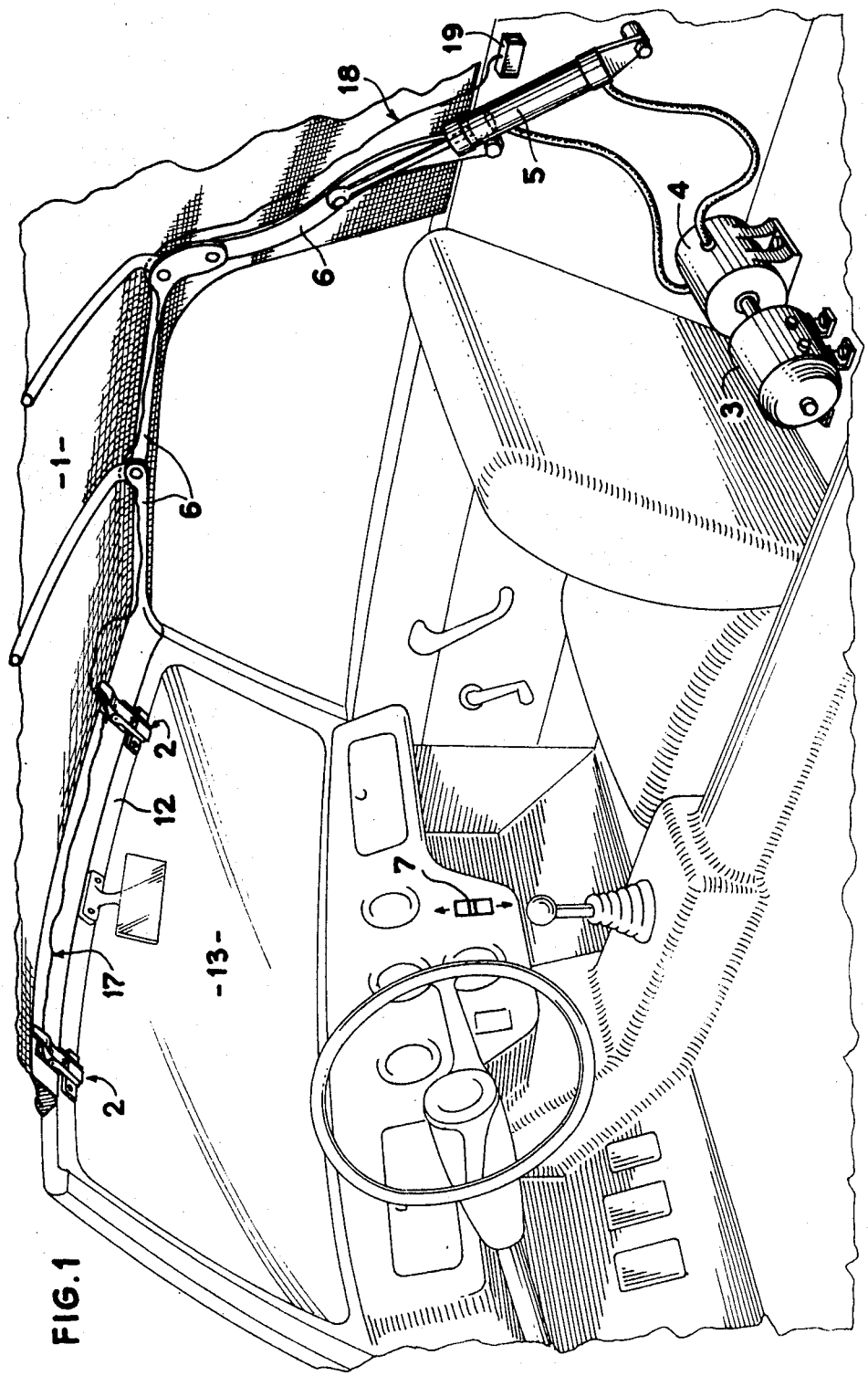
FIG. 1 is a perspective view of the inside of a part of a convertible vehicle having its top in the closed position, the electrohydraulic control device therefor being shown diagrammatically.
Figure 2:
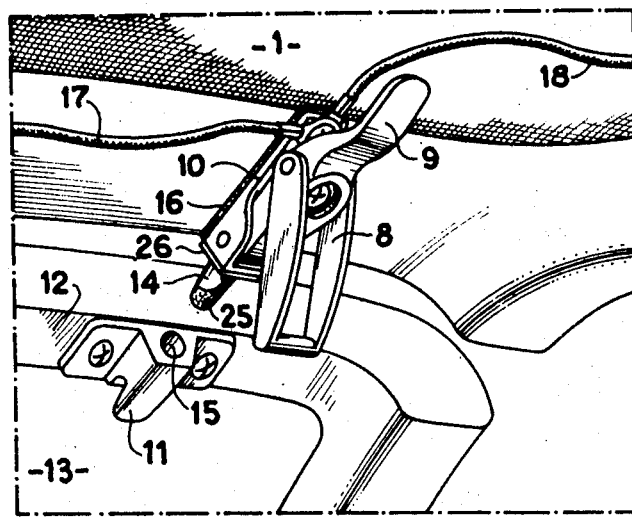
FIG. 2, 3 and 4 show, on an enlarged scale, one of the manual locking devices in three possible positions.

Reference will first be had to FIG. 1 in which the invention is shown as applied to a panel in the form of a top 1 of a cabriolet. This top is held stationary in the closed position by manually operated locking means 2 which are here two in number and are conventionally called catches.

The top can be shifted by any known electric control device. In the presently described embodiment, the hood is shifted by an electric motor 3 which drives a pump 4 supplying oil under pressure to two hydraulic cylinders or motors 5 only one of which is shown. The movement of the hydraulic cylinder device 5 is transmitted to the hood through a linkage 6. According to the direction of rotation of the motor which is controlled from the control panel by a switch 7, the top is opened or closed respectively by the closure of the circuit at $o$ or at $f$.

Each locking means 2 comprise in the known manner a yoke or ring 8 which is actuated with an overcenter movement by a lever 9 which is pivoted to a base 10 fixed to the top 1, and a fixed hook 11 integral with the surround 12 of the windscreen 13. A pin 14 for centering the base 10 is adapted to engage in a recess 15 in the top 11 and position the top in the closed position of the latter.

According to the invention, the hooks 11 are electrically connected to the mass of the vehicle whereas each assembly comprising the yokes 8, the levers 9, and the bases 10 are each insulated from the vehicle by a pad 16 but are interconnected by a lead 17 and moreover connected to one of the terminals of a coil of a relay 19 through another conductor or lead 18. The hook 11 and yoke 8 thus constitute the two contacts of a switch.

The other terminal of the coil of this relay 19 is connected to the battery 20 of the vehicle through a general or main switch 21 which can be the contact switch, whereas the return to the ground is through any one of the locking means 2, which are in parallel relation, when the yoke 8 and the top 11 of the locking means are not completely separated.

The armature 22 of the relay is connected to an opening contact or switch 23 through which the switch 7 is connected to the battery 20, for example through the switch 21.

The device is completed by a diode 24 connected to the terminals of the relay 19 and absorbing overvoltages which could appear owing to the self-inductance of its coil when cutting off the current.

It is advisable to electrically insulate the pin 14 from the recess 15 and the support face of the base 10 from the hook 11, for example by plastics layers 25, 26 provided on the pin 14 and on said support face.

Figure 4:
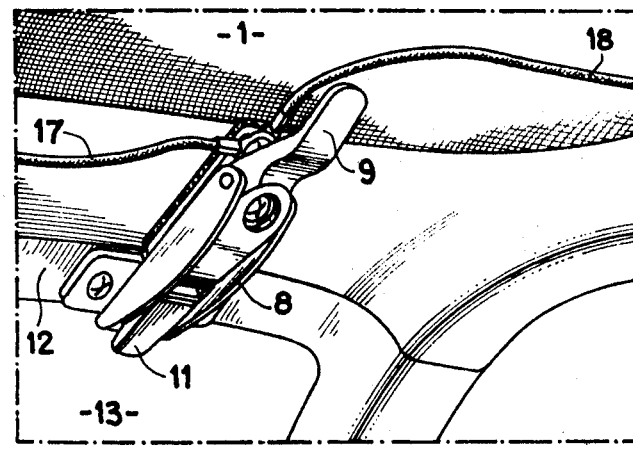
Figure 5:
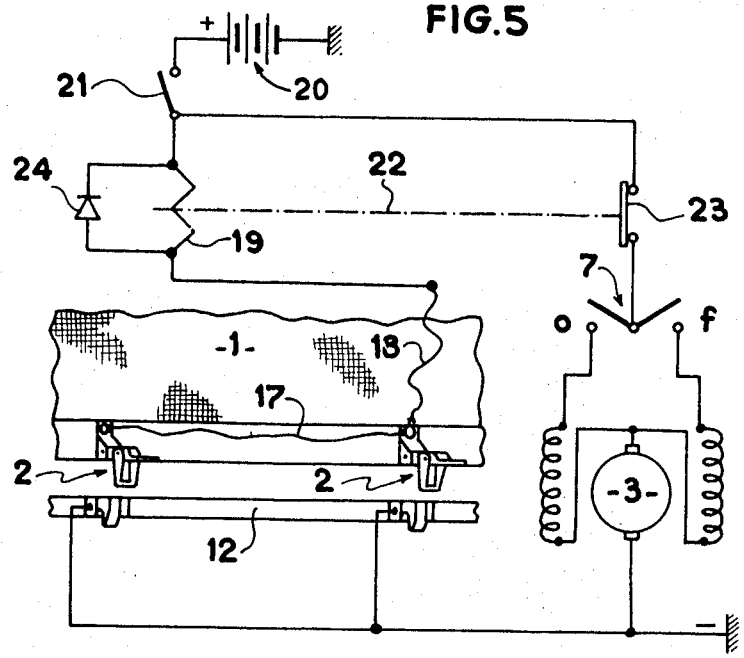
FIG. 5 shows the electric control circuit.

The device according to the invention operates in the following manner:

Starting with the closed position with the top opened out, so long as at least one of the catches 2 has not been unlocked (FIG. 4), the relay 19 is energized and maintains the contact 23 open so that no current can be supplied to the motor 3.

Figure 3:
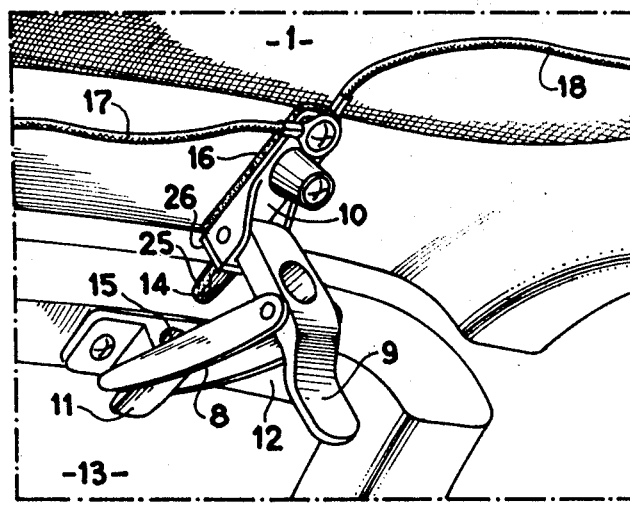

Likewise, if one of the catches 2 is imperfectly opened, the yoke 8 resumes its hooking position at the start of the operation (FIG. 3) and the relay 19 is reenergized and once more opens the contact 23 and thus stops the motor.

On the other hand, when both catches 2 are correctly unlocked, the relay 19 is no longer energized and the contact 23 is closed and allows the motor 3 to be supplied with current.

The insulating function of the layer 25 of the pin 14 can be understood. Indeed, if the latter was not insulated, the return circuit of the relay 19 could be established by the contact of the pin 14 in the recess 15 of the hook 11 not withstanding the fact that the catch had been correctly unlocked.

However, the insulation of the pin 14 is not essential although, if not employed, it is necessary after having unlocked the catches 2, to start manually the opening movement of the top in order to disengage the pins from the recesses 15.

Figure 6:
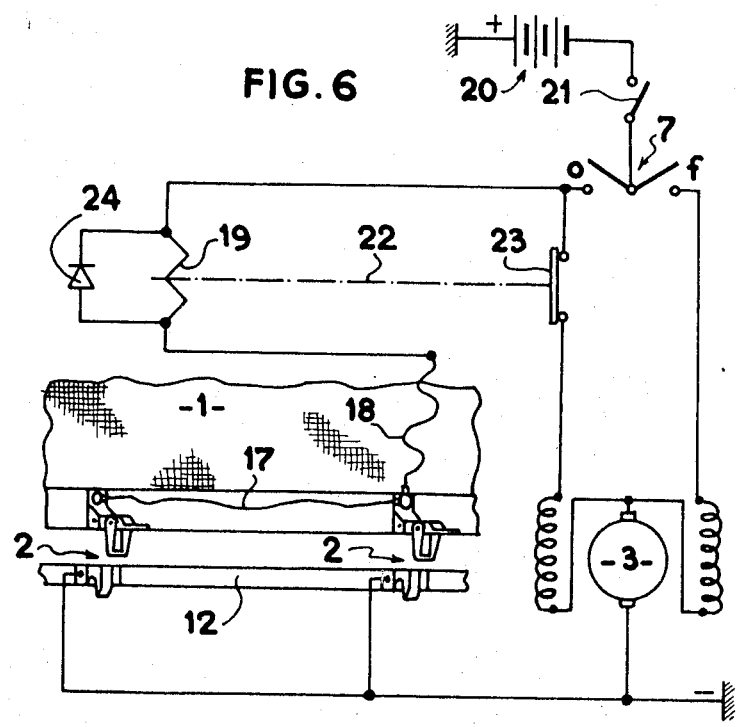
FIG. 6 shows a modification of this electric circuit.

FIG. 6 shows a modification of the electric circuit diagram in which the relay 19 is connected in series with the "open" contact $o$ of the switch 7. In this arrangement, the relay 19 consumes no current in normal operation, since it is energized only when it is desired to open the top when at least one of the catches 2 is not or is imperfectly unlocked. In this case, the immediate opening of the contact or switch 23, as in the previous arrangement, prevents the motor from starting up.

No safety arrangement has been provided in the diagram shown in FIG. 6 for the closing since usually no locking means are employed for maintaining the top in the open position. However, it will be quite clear that, if need be, a relay identical to the relay 19 could be provided in series with the closing contact $f$ of the switch 7.

I claim:

1. A control device for shifting a movable closing panel movable between two extreme positions, said device comprising an electric motor for shifting the panel between said extreme positions, manually controlled locking means for locking the panel in one of said extreme positions, a supply circuit for the motor, a first switch in said supply circuit, a relay having a moving element connected to said first switch for actuating said first switch, and a relay supply circuit, a second switch having a moving contact and a fixed contact in said relay supply circuit, said locking means comprising a hook, a base, a lever pivoted to the base and capable of pivoting through an overcenter, a yoke connected to the lever and capable of hooking the hook for locking said panel in said one extreme position, the hook and the base constituting respectively said contacts of said second switch, the arrangement being such that said first switch is opened by said moving element when the relay is energized by the closure of said second switch and said first switch is closed by said moving element when said second switch is opened by separation of the hook from the base.

2. A control device as claimed in claim 1, comprising a plurality of said locking means constituting a plurality of second switches connected in parallel in said relay supply circuit.

3. A control device as claimed in claim 1, wherein the motor is reversible and a third switch is in said supply circuit for the motor and associated with the motor for selecting the direction of rotation of the motor, said first switch being connected in series with said third switch.

4. A control device for shifting a movable closing panel movable between an open position and a closed position, said device comprising an electric motor for shifting the panel between said open and closed positions, manually controlled locking means for locking the panel in said closed position, a supply circuit for the motor, a first switch in said supply circuit, a relay having a moving element connected to said first switch for actuating said first switch, and a relay supply circuit, a second switch having a moving contact and a fixed contact in said relay supply circuit, said locking means comprising a hook, a base, a lever pivoted to the base and capable of pivoting through an overcenter, a yoke connected to the lever and capable of hooking the hook for locking said panel in said closed position, the hook and the base constituting respectively said contacts of said second switch, the arrangement being such that said first switch is opened by said moving element when the relay is energized by the closure of said second switch and said first switch is closed by said moving element when said second switch is opened by separation of the hook from the base, the motor being reversible, a third switch being associated with the motor for selecting the direction of rotation of the motor, said third switch having a first fixed contact corresponding to operation of the motor in a direction for shifting the panel to said open position and a second fixed contact corresponding to operation of the motor in a direction for shifting the panel to said closed position, said first switch being connected between said first contact and the motor.

5. A control device for shifting a movable closing top of a convertible vehicle movable between two extreme positions, said device comprising an electric motor for shifting the top between said extreme positions, manually controlled locking means for locking the top in one of said extreme positions, a supply circuit for the motor, a first switch in said supply circuit, a relay having a moving element connected to said first switch for actuating said first switch and a relay supply circuit, a second switch having a moving contact and a fixed contact in said relay supply circuit, said locking means comprising a hook, a base, a lever pivoted to the base and capable of pivoting through an overcenter, a yoke connected to the lever and capable of hooking the hook for locking said panel in said one extreme position, the hook and the base constituting respectively said contacts of said second switch, the arrangement being such that said first switch is opened by said moving element when the relay is energized by the closure of said second switch and said first switch is closed by said moving element when said second switch is opened by separation of the hook from the base.